United States Patent [19]

Castelaz

[11] Patent Number: 5,093,781
[45] Date of Patent: Mar. 3, 1992

[54] CELLULAR NETWORK ASSIGNMENT PROCESSOR USING MINIMUM/MAXIMUM CONVERGENCE TECHNIQUE

[75] Inventor: Patrick F. Castelaz, Yorba Linda, Calif.

[73] Assignee: Hughes Aircraft Company, Los Angeles, Calif.

[21] Appl. No.: 255,692

[22] Filed: Oct. 7, 1988

[51] Int. Cl.$^5$ .................................... G06F 15/00
[52] U.S. Cl. .............................. 395/800; 364/223.1; 364/274; 364/276.5; 364/276.6; 364/276.8; 364/DIG. 1; 395/1
[58] Field of Search ... 364/200 MS File, 900 MS File, 364/513, 807

[56] References Cited

U.S. PATENT DOCUMENTS

| | | | |
|---|---|---|---|
| 3,950,733 | 4/1976 | Cooper et al. | 364/900 |
| 4,254,474 | 3/1981 | Cooper et al. | 364/900 |
| 4,326,259 | 4/1982 | Cooper et al. | 364/715 |
| 4,450,530 | 5/1984 | Llinas et al. | 364/513 |
| 4,591,980 | 5/1986 | Huberman et al. | 364/200 |
| 4,660,166 | 4/1987 | Hopfield | 364/807 |
| 4,719,591 | 1/1988 | Hopfield et al. | 364/807 |
| 4,731,747 | 3/1988 | Denker | 364/807 |
| 4,737,929 | 4/1988 | Denker | 364/807 |
| 4,755,963 | 7/1988 | Denker et al. | 364/807 |
| 4,858,147 | 8/1989 | Conwell | 364/513 |
| 4,914,604 | 4/1990 | Castelaz | 364/517 |

OTHER PUBLICATIONS

Kirkpatrick, S. et al., "Optimization by Simulated Annealing", Science, vol. 220, pp. 671-680 (1983).
Lippman, Richard P.—"An Introduction to Computing with Neural Nets", IEEE ASSP Mag. Apr. 1987.

Primary Examiner—Allen R. MacDonald
Assistant Examiner—Matthew C. Fagan
Attorney, Agent, or Firm—Wanda K. Denson-Low

[57] ABSTRACT

A cellular network assignment processor (10) for solving optimization problems utilizing a neural network architecture having a matrix of simple processing cells (12) that are highly interconnected in a regular structure. The cells (12) accept as input, costs in an assignment problem. The position of each cell (12) corresponds to the position of the cost in the associated constraint space of the assignment problem. Each cell (12) is capable of receiving, storing and transmitting cost values and is also capable of determining if it is the maximum or the minimum of cells (12) to which it's connected. Operating on one row of cells (12) at a time the processor (10) determines if a conflict exists between selected connected cells (12) until a cell (12) with no conflict is found in each row. The end result is a chosen cell (12), in each row, the chosen cells (12) together representing a valid solution to the assignment problem.

14 Claims, 5 Drawing Sheets

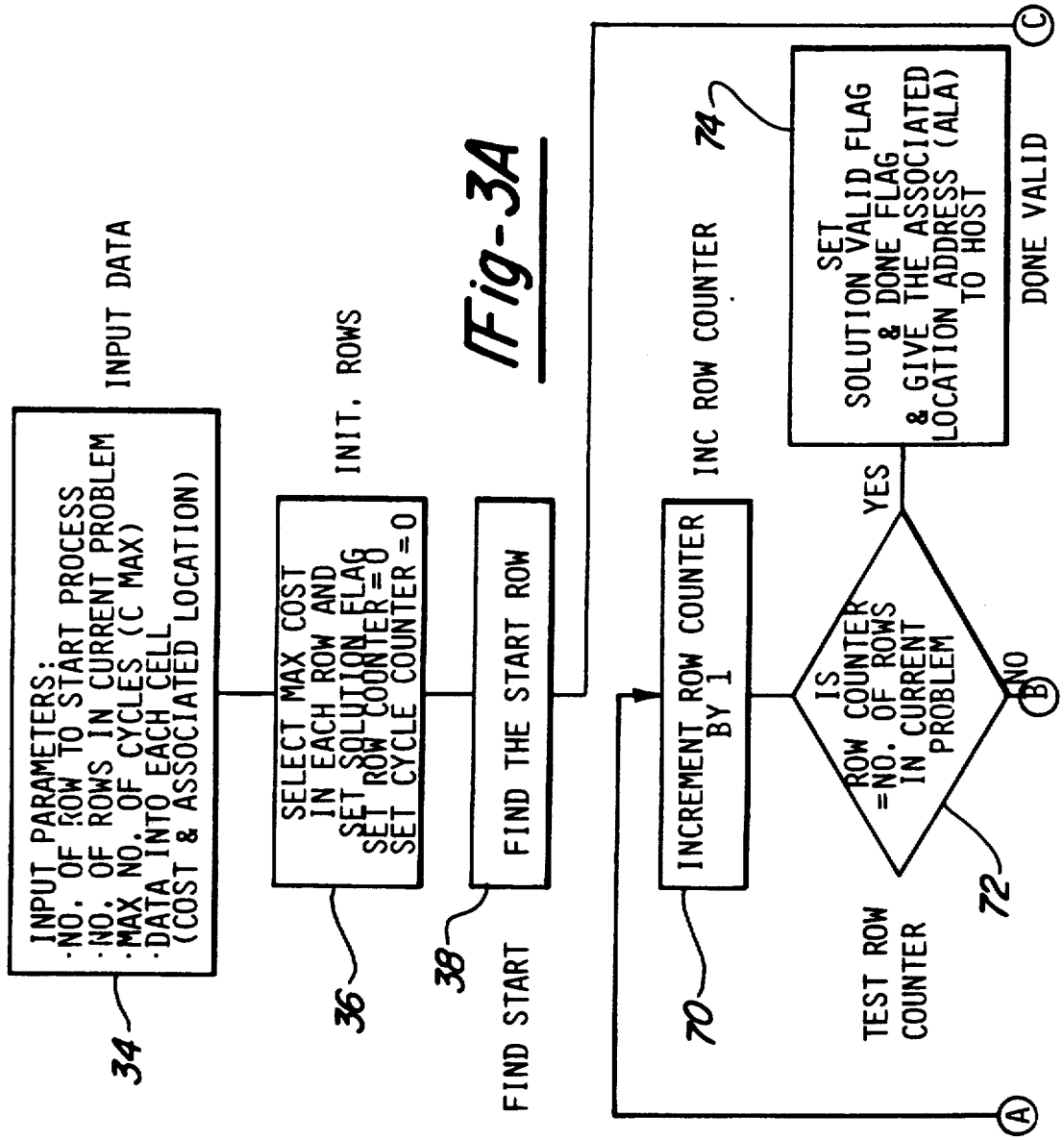

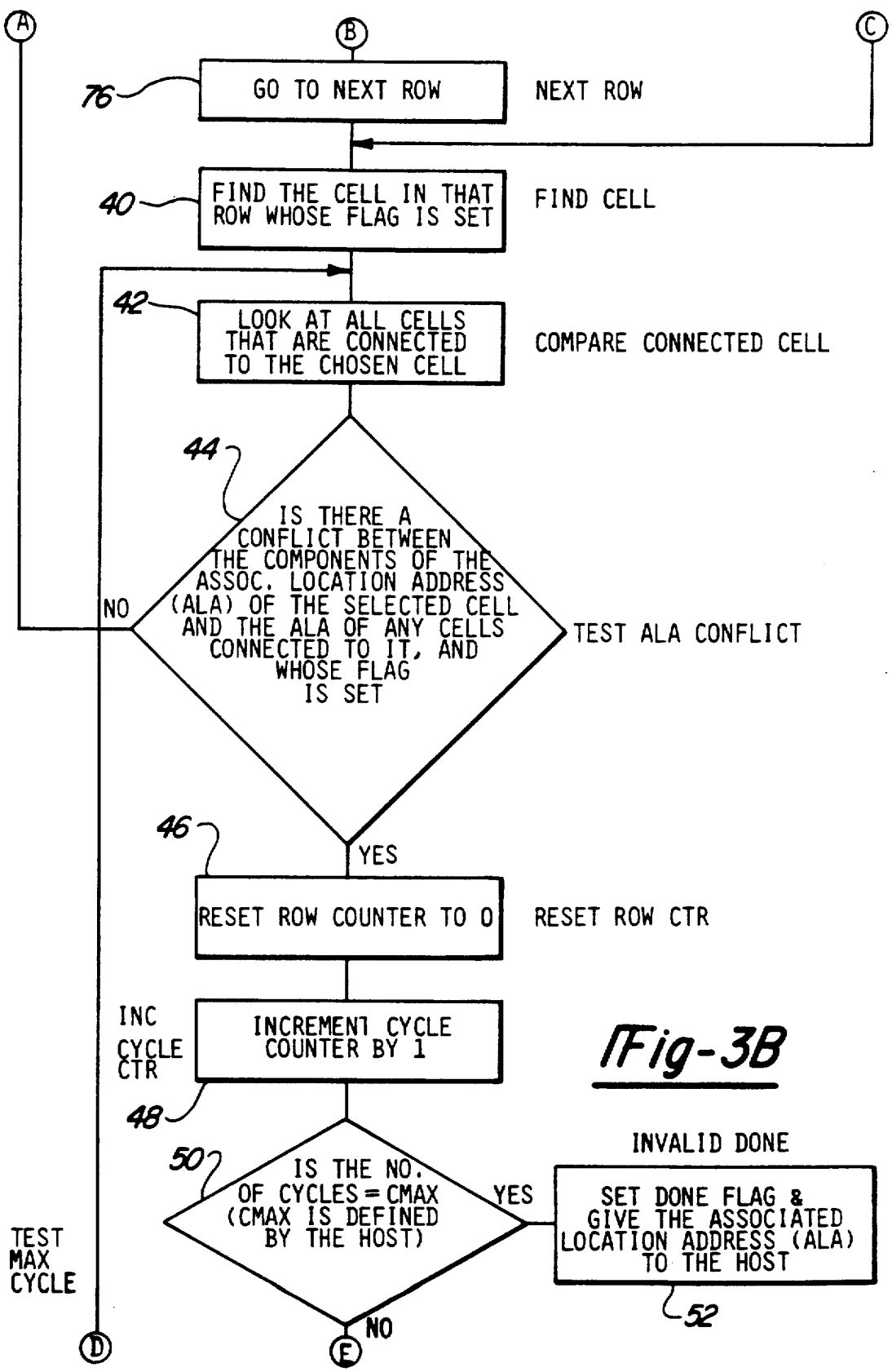

CELLULAR NETWORK ASSIGNMENT PROCESSOR USING MINIMUM/MAXIMUM CONVERGENCE TECHNIQUE

BACKGROUND OF THE INVENTION

1. Technical Field

This invention relates to information processors, and more particularly to a cellular network assignment processor for solving optimization problems.

2. Discussion

Optimization problems, such as constrained assignment problems, are among the most difficult for conventional digital computers to solve. This is because assignment problems are generally not solvable with a single solution, but instead there may be a range of possible solutions of which the best solution is sought. Often, the processing technique requires one entity to be selected from among many and assigned to one and only one other entity in such a way as to force the entire assignment over all entities to be optimal in some sense. For example, where individual "costs" are assigned to each entity-to-entity mapping, the problem becomes one of minimizing the total cost.

Examples of assignment problems include optimal plot-to-track correlation processing, the Traveling Salesman Problem, optimal weapons allocation, computerized tomography, multi-beam acoustic and ultrasound tracking, nuclear particle tracking, deghosting for angle-only (passive) targets detected by multiple sensors, etc. Of particular interest is the deghosting problem. This problem arises whenever targets are to be detected from angle-only data originating from multiple sensors. For example, the sensors may be radar, infrared, optical or other types of sensors. In such cases a single sensor provides a measurement that consists of the angle (azimuth) on which a target lies on a line-of-bearing. With two or more sensors, the location can be determined as the intersection of the two lines-of-bearing. However, with multiple targets, multiple lines-of-bearing will be seen at both sensors. Lines will cross and intersections will be formed at points where no target actually exists. These intersections are called ghosts.

To illustrate the severity of the problem, if ten targets are observed by two sensors, up to 100 intersections can be formed. Since there are only 10 targets that means 90 of the intersections will be ghosts. With 50 targets, 2,500 intersections and 2,450 ghosts could be formed. Since the sensors have no other information available, no further discrimination of targets can be made.

The addition of a third sensor might help to resolve the ambiguities since one would find targets at the intersection of three lines-of-bearing, or triple intersections. However with measurement inaccuracies, three lines-of-bearing corresponding to a true target will not intersect at a single point but will define a triangular region. The problem then is to first determine which triangular regions have small enough areas that they might be targets, and then to sort out the true targets from the ghosts in a group where there are many more intersections than targets. While targets will generally have smaller areas, merely taking the smallest areas will not ensure that no ghosts will be chosen.

Some previous approaches to assignment problems, such as the deghosting problem, have emphasized solutions in software on general purpose computers. One disadvantage with software solutions to assignment problems is that they require massive computational power and are exceedingly slow for real-time or near-real-time problems such as angle-only target location problems. This is because these problems frequently involve a "combinatorial explosion", an exponential blowup in the number of possible answers. Thus, to solve the deghosting problem, conventional solutions, even using advanced state of the art array and parallel processors, have difficulty handling real-time problems of realistic sizes. For example, conventional solutions of the deghosting problem are sufficiently fast up to about 15 targets, but become exponentially computation-bound beyond that. For numbers of targets in the range of 30 or so, typical software approaches using integer programming techniques could require virtually years of VAX CPU time.

Others have suggested approaches for solving assignment problems utilizing neural networks. Such systems are called neural networks because of their similarity to biological networks in their highly interconnected structure and in their ability to adapt to data and exhibit self-learning. For example, see U.S. Pat. No. 4,660,166, issued to J. Hopfield, where a type of neural network is used to solve the Traveling Salesman Problem. Others have suggested the use of a neural network technique known as simulated annealing. See S. Kirkpatrick, Gelatt, and Vecchi: "Optimization by Simulated Annealing", 220 Science, p.671-680 (1983). However, while algorithms using this approach have been developed, to the applicant's knowledge, actual working architectures have not been implemented. Also, neural nets such as the one described in U.S. Pat. No. 4,660,166 are generally not fast enough for real-time applications of reasonable complexity. Recent results suggest severe limitations to the size of problems addressable by Hopfield nets. For example, the traveling salesman problem fails for more than thirty cities.

Thus it would be desirable to provide an information processor that reduces the computation time required to solve constrained assignment problems of realistic sizes in real-time.

SUMMARY OF THE INVENTION

Pursuant to the present invention, an information processor is provided that can rapidly solve assignment problems, utilizing a relatively simple architecture. The processor utilizes a novel neural network architecture having a matrix of simple processing elements, or cells, that are highly interconnected in a regular structure, such that the processing is embedded in the structure. These characteristics are also found in biological neural networks. In addition, in one embodiment of the present invention the individual processing elements employ an additional characteristic found in biological neural networks known as a refractory period.

The cells accept as input, data which represents information, or "costs" in an assignment problem in two or greater dimensions. The position of each cell has an address that corresponds to the position of the cost in the associated constraint space of the assignment problem. Each cell comprises a processor unit that is capable of receiving, storing, and transmitting information values. Each cell is connected in such a way that it is connected to all other cells to which it is in conflict. A conflict is defined in the architecture as existing when more than one cell contains cost data in a given row of the matrix. The goal of the processing is to find a solution having one cost value in each row with no conflicts. In the deghosting problem, a row corresponds to a single target's angle relative to one of the three sensors, and a conflict corresponds to a ghost, or secondary triple intersect along that angle.

The cost value in each cell is compared to all other cost values in a given row to which it is connected, to determine if it is the minimum or the maximum of said cost value. An identification, or flag, is set in the cell chosen as the current candidate in its row. For convenience in discussion, the cell with maximum cost is chosen e.g., we wish to maximize total cost. At any given time, the total number of flags set equals the number of rows, and the flagged cells represent a particular solution to the assignment problem. Operating on one row at a time, the processor determines if a conflict exists between the flagged cell in the chosen row and the cells in all other rows to which it is connected and which have flags set. (By definition, all cells in the same row are in conflict). When conflicts are found, the processor looks for a new solution among all enabled (refractory period=0) cells whose flags are set and are not in the current row. The enabled cell with minimum cost is chosen to be reset, and the maximum cost (whose refractory period=0) cell in its row is chosen as the next potential participant. Processing continues with this cell.

When no conflict is found for a particular cell, that cell is chosen to be part of a potentially valid solution. Once a cell with no conflict is found in each and every row, the flagged cells in each row will represent a near optimal solution to the assignment problem, which satisfies the one-cell-per-row constraint and minimizes or maximizes the cost values. In a sense, the processor "bootstraps" to a global maximum, by continually pushing aside minimum cells and seeking out maximum cost cells to participate in the solution.

Whether the minimum or maximum cost is sought depends on the definition chosen for cost value. In the preferred embodiment, a refractory period is used so that after a conflict is found, the cell is disabled for a given period of time while other solutions are searched within the row. Once the refractory period is over the cell may again participate in solutions.

BRIEF DESCRIPTION OF THE DRAWINGS

The various advantages of the present invention will become apparent to one skilled in the art by reading the following specification and by reference to the following drawings in which:

FIGS. 3A, 3B and 3C represent a flow chart of the steps performed by the cellular network assignment processor in solving an assignment problem in accordance with the present invention.

DESCRIPTION OF THE PREFERRED EMBODIMENT

Figure 1:
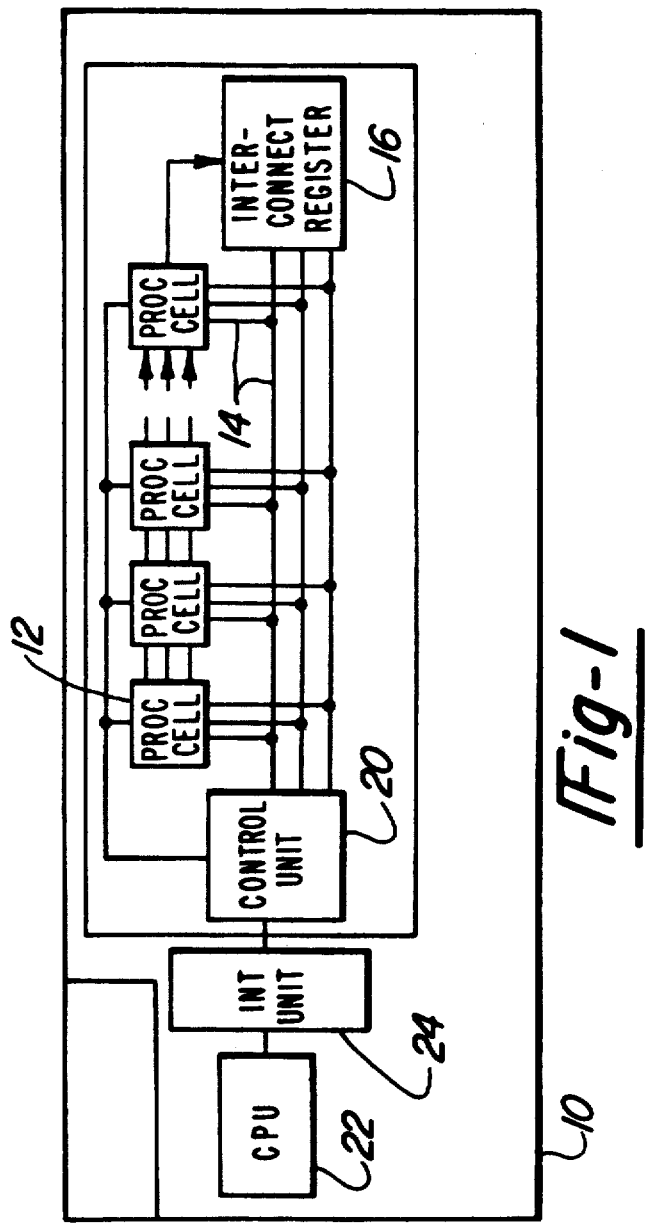
FIG. 1 is a diagram of the architecture of the cellular network assignment processor in accordance with the teachings of the present invention.

Referring to FIG. 1, a diagram of the architecture of the cellular network assignment processor 10 in accordance with the present invention is shown. In the preferred embodiment, the cellular network assignment processor (CAP) is adapted to solve constrained assignment problems, such as deghosting for angle-only information from three sensors. The CAP processor 10 contains an array of processing cells 12. Each of the processing cells 12 is located at a particular address, and contains a cost register which stores the cost value of the assignment problem. Information may be transmitted to and from the cells 12 through address lines 14. Each cell is also capable of comparing its own cost value with other cells to which it is connected to determine if it is a minimum or a maximum of the connected cost values. In addition, the cells 12 may contain a refractory period register which stores a given refractory period and counts down when that period is set for a given period of time. Also, the cells 12 contain a solution-flag register which signifies that the cell 12 is chosen for a correct solution. It will be appreciated that implementation of these functions in each cell 12 can be performed with electrical circuitry comprising about 200 gates.

An interconnect register 16 is connected to the address lines 14 and also is used to determine which of these cells 12 have identified themselves as being a minimum or a maximum. The interconnect register 16 implements the actual interconnection between the cells. Also a CAP control unit 20 instructs the cells to perform their various functions as will be described below.

To begin the processing, a host CPU 22 and an interface unit 24 receive the cost information in the assignment problem and transmit this information to the CAP control unit 20, which in turn transmits the appropriate cost value to the corresponding cell 12. In deghosting angle-only information from 3 sensors, there will be a three dimensional cube of cells. In FIG. 1 the cells 12 are shown in two dimensions to simplify the drawing. It will be appreciated that the three address lines 14 connecting each cell permit a three dimensional cube of cells to be represented. Rows of cells on a first, or X-axis in a first plane in the cube will correspond to all possible sensor angles for a first sensor. Cell locations on the Y-axis, perpendicular to the X-axis, correspond to all the possible sensor angles for a second sensor. Likewise, locations for the Z-axis, perpendicular to both the X and Y-axis, represent all possible sensor angles for a third sensor. Thus, a cell location or address may be defined by a coordinate system in which each coordinate represents a particular input parameter.

Figure 2:
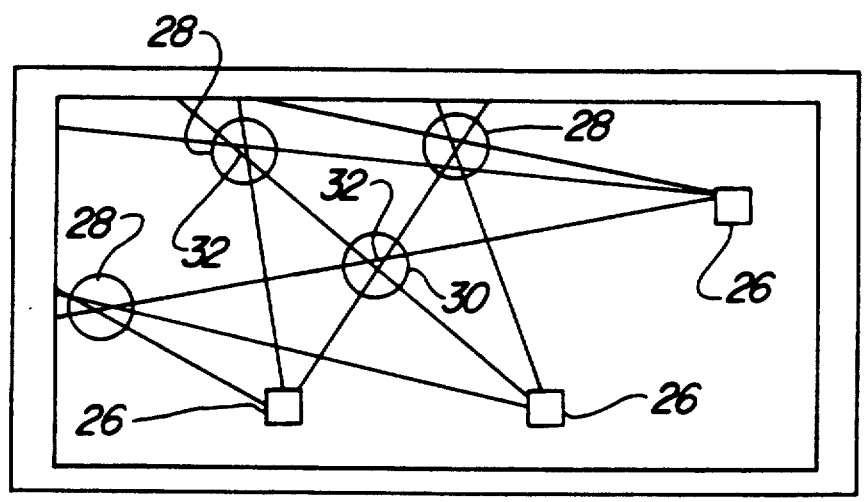
FIG. 2 is a diagram of a typical deghosting problem with angle-only data from 3 sensors.

Referring now to FIG. 2, the information to be stored in each cell 12, represents triple intersects of three sensors. That is, when a sensor 26 detects a target 28, a line is plotted from the sensor 26 location to the target 28 location. Every point where the lines from the 3 sensors 26 all intersect is called a triple intersect. Note, however, that some of these intersects represent real targets 28 and thus are valid, while some are "accidental" triple intersects and are invalid or "ghosts" 30. The assignment problem is to eliminate the ghosts 30 or deghost the data, so that only actual targets 28 are detected.

As will be appreciated, the host CPU 22 in FIG. 1 can be connected to the sensors 26 and can detect the triple intersects and transmit the angular data from each sensor 26 that corresponds to each triple intersect. In addition, the host CPU 22 will also calculate the area of the triangles found in each triple intersect. This triangle 32 is formed because of measurement errors in the sensor data. Even for valid targets, the triple intersect will not be point but will be instead a small triangular area formed by the three lines. The host CPU 22 will call a triple intersect those intersects, having a triangle with an area below a given criteria. The host CPU 22 will then transmit the digital data representing this area for each triple intersect to the cell 12 associated with those three angles for the three sensors. It is the area of this error triangle 32 that is the "cost" in the assignment problem. The CAP processor 10 minimizes total cost by minimizing the area of the triangles 32 in a given solution. Since triangles 32 corresponding to ghosts 30 will tend to be larger than those corresponding to real targets 28, the CAP processor 10 eliminates ghosts 30 by choosing solutions having smaller triangles 32. The assumption that real targets 28 will have smaller triangles 32 than ghosts 30 is generally valid for problems having up to about 50 targets. As the density increases, with greater targets, the number of ghosts 30 becomes extremely large. For example, there may be tens of thousands of ghosts. At this point, the probability is increased that some ghosts may have smaller triangles than targets and performance could begin to degrade.

In summary, the host CPU 22 receives the angular data from the sensors 26, determines where triple intersects occur, and sends the area of the error triangle 32 of the triple intersect to the cell 12 associated with that set of angles from the three sensors. The cells 12 then, by their location or coordinates in the CAP processor 10, represent a mapping of a set of three sensor 26 angles, and each cell 12 stores the area of the error triangle 32 for that particular intersect.

Figure 3C:
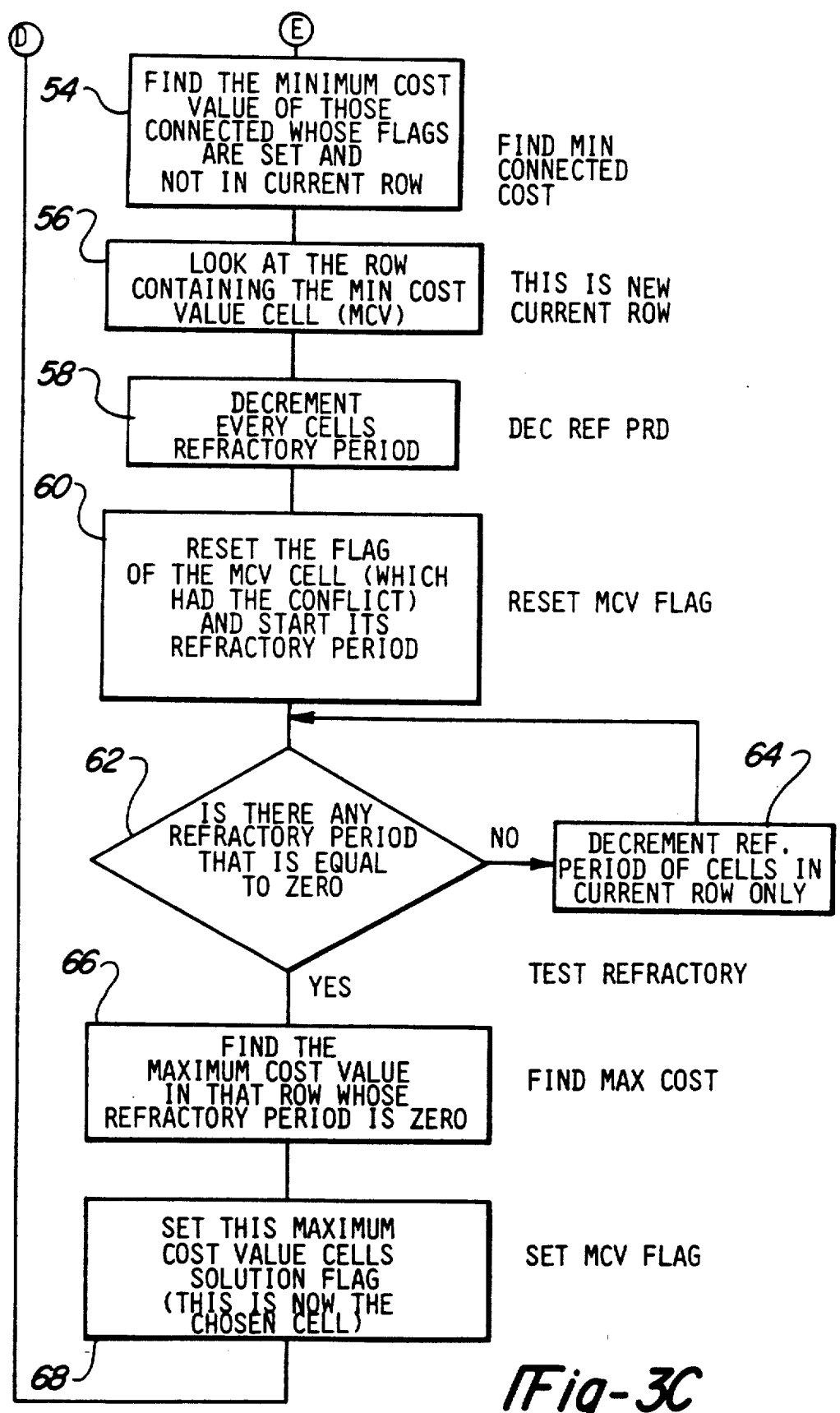

Referring now to FIGS. 3A, 3B and 3C, there is shown a flow chart of the steps performed by the CAP processor 10 in finding an optimal solution to an assignment problem. It should be noted that costs may be defined so that the goal of the processing is to maximize or minimize cost. In the following discussions, the goal of the processing will be to maximize total cost. In the first step (Step 34), the host computer 22 is given a number of input parameters including the number of the row, or start row that is to initialize the process. It should be noted that each row in each of the three dimensions in the cube of cells 12 correspond to a particular angle for a particular sensor 26. The total number of rows for each sensor 26 corresponds to the total number of real targets 28. The host CPU 22 counts the number of rows in the current problem. Also an arbitrary number of cycles is fed to the host CPU 22. Then, the cost data is fed into each cell 12 by the host CPU so that the cost data is located at a cell 12 at an address which corresponds to the location of that cost in the assignment space of the assignment problem. For example, in the 3 sensor deghosting problem the cost will comprise the area of an error triangle 32 for a particular triple intersect, and will be located at an address which represents the angle of a sensor 26 for that triple intersect.

Cells which are stored with costs are then interconnected by the interconnect register 16, as follows. A cell are connected to all other cells 12 to which it has any potential conflicts. Thus, the cell representing the triple intersect at address (A, B, C) will be connected to all other cells containing cost data having addresses of either (A, X, X), (X, B, X) or (X, X, C). As a result, if any single row contains two or more triple intersects, the group cells representing those intersects will be connected to each other by the interconnect register 16. In other words, groups of cells 12 in particular rows are connected to other cells with they are in conflict. Only one of the cells 12 in a particular row represents a true target 28 and the others represent ghosts 30. Next, the maximum cost in each row is determined. (Step 36) This may be the only cost in a particular row or it may be the maximum of whatever number of costs are in the particular row. Where there are more than one cost in a row, only one is a valid target and the rest are ghosts. Also, in this step (Step 36) a solution flag is set for the maximum cost. It should be noted, however, that some other way of assigning the initial flags, could be used, such as a random assignment of one cost per row. This is merely an initializing, or a first proposed solution, to create a starting point from which the CAP processor 10 will move toward better and better solutions. A row counter and a cycle counter are also set to zero. These counters exist in software within the CAP controller 20. In the next step, (Step 38) the CAP controller 10 finds the row that was defined as the start row in (Step 34). The cell in that start row whose flag is set is then located (Step 40). This is currently the chosen cell.

The CAP controller 20 next compares the chosen cell to all cells 12 that are connected to it (Step 42). The CAP controller 20 next determines if there is a conflict between the associated location address (ALA) of the selected cell and the ALA of any cells 12 connected to it and whose flag is set (Step 44). By virtue of being connected, connected cells 12 have at least one of the three rows the same as the chosen cells, so they are in conflict. Step 44 looks to see if any of the connected cells have a flag that is set. Since the cells with flags represent potential solutions, the question is, are there any conflicts in this proposed solution. When a conflict is found in step 44 the row counter in the CAP controller 20 is reset to zero. (Step 46), and the cycle counter is incremented by one. (Step 48) The CAP controller 20 then determines if the maximum number of cycles has been reached. (Step 50) If it has, the invalid done flag is set and the ALA of the chosen cell is transmitted to the host CPU 22. (Step 52) If instead the maximum number of cycles has not been reached as determined in step 50, the chosen cell will instead find the minimum cost value of those connected cells whose flags are set and not in the current row. (Step 54) The CAP controller 20 will next look at the row containing the minimum cost value cell (MCV) found in Step 54. This row is now the new current row. (Step 56)

Next, every cell's refractory period is decremented. (Step 58) The purpose of the refractory period is to avoid going back to the previous solution. This allows other solutions an opportunity to participate and thereby avoids oscillation. The refractory mechanism disables a particular solution for a period of time. Next, the flag of the minimum cost value cell (MCV) which had a conflict is reset. (Step 60) Resetting disconnects the cell. The refractory period then begins. (Step 60) The CAP controller 20 then looks within the row for a refractory period which is equal to zero. (Step 62) If there are none, the refractory period of all cells in current row are decremented, (Step 64) and Step 62 is repeated until there is a refractory period that is equal to zero. The maximum cost value in that row whose refractory period is zero is then selected, (Step 66) and the solution flag of that cell is set. (Step 68) This now becomes the chosen cell.

The processor then proceeds back to Step 42 and the connected cells are compared to the new chosen cell to determine if there are any conflicts with that cell. (Step 42) If there are still conflicts Steps 44–68 are repeated. If there are no conflicts, the CAP processor 10 proceeds to Step 70 where the row counter is incremented by 1. (Step 70) The row counter is then tested to see if the row counter has reached its maximum. (Step 72) If it has, then the CAP processor 10 will have operated on all rows and a valid cell will have been found for each row. Then the solution flag is set and the ALA of the chosen cell is transmitted to the host CPU 22 as a valid solution (Step 74). If instead the row counter has not reached its maximum, then the CAP processor 10 proceeds to the next row (Step 76), and Steps 40-72 are repeated for the next row.

In summary, once the CAP processor 10 has operated on each row a potential solution will have been found. If the done flag has been set for a cell in each row and the ALA of those cells are all independent (none in conflict with one another), a valid solution will have been found, and will be given to the host CPU. At this point the host CPU 22 can stop the process and the solution found may be obtained. alternatively, the host CPU 22 may instruct the CAP controller 20 to initiate the process again. Due to the randomness of refractory periods the CAP controller 10 could converge to a different solution the next time. Thus the host CPU 22 may keep a running history of the best solutions and only the best solution may be utilized. In addition, the host CPU 22 may contain an interrupt function which permits the current solution to be accessed at any particular time. This interrupt feature is often a requirement for real-time systems where the time the processor is given to arrive at a solution may vary. The complexity of the problem to be solved will determine the number of times the number of final solutions to be found.

It should be noted that beyond solving the deghosting problem for angle-only data from three sensors, the present invention may be adapted to solve other assignment problems such as the Traveling Salesman Problem, optimal plot-to-track correlation processing, optimal weapons allocation, computarized tonography and others. It will be appreciated that the basic components of the CAP processor 10 may be implemented with conventional electrical circuits such as programmable logic devices. Also, optical devices may be used for some of the functions. From the foregoing description it can be appreciated that the present invention provides a cellular network assignment processor 10 capable of solving assignment problems in real-time, at speeds of 3-4 orders-of-magnitude faster than conventional solutions. Those skilled in the art can appreciate that other advantages can be obtained from the use of this invention and that modification can be made without departing from the true spirit of the invention after studying the specification, drawings and following claims.

What is claimed is:

1. A method for processing information comprising:
   assigning an address to each of a plurality of processing cells, said address including coordinates representing a particular set of input parameters for a multidimensional assignment problem, said input parameters originating from a plurality of sources wherein parameters from each of said sources correspond to one of said dimensions of said assignment problem, and wherein each of said processing cells receives, stores, and transmits information values;
   storing one of said information values in each processing cell;
   connecting each individual processing cell to every other processing cell whose assigned address has a conflict with the assigned address of said individual processing cell, said conflict defined as occurring when the assigned address of said individual processing cell has at least one common input parameter with the assigned address of another processing cell;
   comparing the information values of processing cells in each of a plurality of groups of processing cells which are connected;
   setting a flag in those processing cells which meet a preselected criteria of the compared information values for each group;
   determining if a conflict exists between each flagged processing cell and other flagged processing cells;
   unsetting the flag in those flagged processing cells which are in conflict with other flagged processing cells as determined by said determining step; and
   performing the steps of comparing, setting flags, determining, and unsetting flags on one group of processing cells at a time until a flagged processing cell having no conflicts with other flagged processing cells is found for each group, whereby said flagged processing cells having no conflicts with other flagged processing cells together represent an optimal solution to said assignment problem.

2. The method of claim 1 wherein said step of setting a flag in those processing cells which meet a preselected criteria comprises setting a flag in those processing cells which have the maximum of the compared information values for each group.

3. The method of claim 1 wherein said step of setting a flag in those processing cells which meet a preselected criteria comprises setting a flag in those processing cells which have the minimum of the compared information values for each group.

4. The method of claim 1 wherein said step of comparing is performed by each processing cell.

5. The method of claim 4 wherein said sources are sensors and said assignment problem involves the deghosting of angle-only target data from multiple targets sensed by said sensors;
   each of said input parameters represent angles for one of said sensors;
   the total number of input parameters from one of said sensors equals the number of targets in said assignment problem; and
   said information values are cost values proportional to an area formed by the intersection of paths from said sensors to said targets.

6. The method of claim 1 wherein the step of setting flags further comprises the step of disabling selected ones of said processing cells for a period of time so that said flags in said selected ones of said processing cells cannot be set while other solutions to said assignment problem are processed.

7. The method of claim 6 wherein said period of time is set randomly.

8. In an information processor having a plurality of processing cells, each of said cells for receiving, storing, and transmitting an information value, the improvement comprising:
   means for assigning an address to each processing cell, said address including coordinates representing a particular set of input parameters for a multidimensional assignment problem, said input parameters originating from a plurality of sources wherein parameters from each of said sources correspond to one of said dimensions of said assignment problem;

means for connecting each individual processing cell to every other processing cell whose assigned address has a conflict with the assigned address of said individual processing cell, said conflict defined as occurring when the assigned address of said individual processing cell has at least one common input parameter with the assigned address of another processing cell;

means for comparing the information values of processing cells in each of a plurality of groups of processing cells which are connected;

means, responsive to said comparing means, for setting a flag in those processing cells which meet a preselected criteria of the compared information values for each group;

means for determining if a conflict exists between each flagged processing cell and other flagged processing cells;

means, responsive to said determining means, for unsetting the flag in those flagged processing cells which are in conflict with other flagged processing cells; and means for controlling said comparing means, said flag setting means, said determining means, and said flag unsetting means, so that said comparing means, said flag setting means, said determining means, and said flag unsetting means all operate on one group of processing cells at a time, until a flagged processing cell having no conflicts with other flagged processing cells is found for each group, whereby said flagged processing cells having no conflicts with other flagged processing cells together represent an optimal solution to said assignment problem.

9. The processor of claim 8 wherein said means responsive to said comparing means for setting a flag in those processing cells includes means for setting a flag in those processing cells which have the maximum of the compared information values for each group.

10. The processor of claim 8 wherein said means responsive to said comparing means for setting a flag in those processing cells includes means for setting a flag in those processing cells which have the minimum of the compared information values for each group.

11. The processor of claim 8 wherein said comparing means comprises means within each processing cell for comparing the information values within each group of connected processing cells.

12. The processor of claim 8 wherein said sources are sensors and said assignment problem involves the deghosting of angle-only target data from multiple targets sensed by said sensors;

each of said input parameters represents angles for one of said sensors;

the total number of said input parameters from one of said sensors equals the number of targets in said assignment problem; and said information values are cost values proportional to an area formed by the intersection of paths from said sensors to said targets.

13. The processor of claim 8 further comprising means for disabling said flag setting means for a predetermined period of time so that said flags in selected ones of said processing cells cannot be set while other solutions to said assignment problem are processed.

14. The processor of claim 13 wherein said period of time is set randomly.

* * * * *